US008121954B2

(12) United States Patent
Oosawa

(10) Patent No.: US 8,121,954 B2
(45) Date of Patent: Feb. 21, 2012

(54) INFORMATION PROCESSOR, METHOD FOR CONTROLLING THE SAME, AND IMAGE FORMING SYSTEM

(75) Inventor: Takaharu Oosawa, Yokohama (JP)

(73) Assignee: Canon Kabushiki Kaisa, Tokyo (JP)

( * ) Notice: Subject to any disclaimer, the term of this patent is extended or adjusted under 35 U.S.C. 154(b) by 542 days.

(21) Appl. No.: 11/462,080

(22) PCT Filed: Mar. 8, 2005

(86) PCT No.: PCT/JP2005/004406
§ 371 (c)(1),
(2), (4) Date: Aug. 3, 2006

(87) PCT Pub. No.: WO2005/088422
PCT Pub. Date: Sep. 22, 2005

(65) Prior Publication Data
US 2006/0287962 A1    Dec. 21, 2006

(30) Foreign Application Priority Data
Mar. 12, 2004  (JP) ................................. 2004-071170

(51) Int. Cl.
*G06F 21/00*  (2006.01)
(52) U.S. Cl. ............... 705/57; 705/50; 705/51; 705/58; 705/59; 705/901; 705/902; 705/904; 705/908; 705/911; 380/227; 380/228; 380/229; 380/230
(58) Field of Classification Search .............. 705/51–59; 713/1
See application file for complete search history.

(56) References Cited

U.S. PATENT DOCUMENTS

| 5,835,765 | A  | * | 11/1998 | Matsumoto .................. 718/102 |
| 6,742,120 | B1 | * | 5/2004 | Markakis et al. ............. 713/184 |
| 6,772,340 | B1 | * | 8/2004 | Peinado et al. ............... 713/168 |
| 7,587,592 | B2 |   | 9/2009 | Watanabe et al. ............. 713/165 |
| 2003/0217011 | A1 |   | 11/2003 | Peinado et al. |
| 2004/0073580 | A1 | * | 4/2004 | Nakayama et al. ........... 707/201 |
| 2005/0160045 | A1 |   | 7/2005 | Watanabe et al. ............... 705/51 |
| 2006/0069653 | A1 | * | 3/2006 | Lelikov et al. .................. 705/59 |

FOREIGN PATENT DOCUMENTS

| EP | 0 813 133 A2 | 12/1997 |
| JP | 10-091427 | 4/1998 |
| JP | 2000-298561 | 10/2000 |
| JP | 2003-330560 | 11/2003 |
| JP | 2003-330564 | 11/2003 |
| WO | WO 03/083646 A1 | 10/2003 |
| WO | WO/03083646 A1 * | 10/2003 |

* cited by examiner

*Primary Examiner* — James A Reagan
(74) *Attorney, Agent, or Firm* — Fitzpatrick, Cella, Harper & Scinto

(57) ABSTRACT

An information processor is capable of restricting the available application program interface for each application program. The information processor capable of executing a predetermined application program includes at least one application program interface for providing predetermined control function for the application program, a determining unit for determining an available application program interface for the application program based on license information of the application program, and an operation controlling means for controlling the operation of the application program interfaces in accordance with the results determined by the determining unit.

7 Claims, 12 Drawing Sheets

FIG. 3

```
public class SampleApp {
    public static void main(Stirng args[ ]) {
        int result;
        result=printer.outdata("Test");                     —301
        System.out.println("Result="+result);               —302
    }
}
```

|  | PRINTER | NETWORK CARD |
|---|---|---|
| APPLICATION A | 347583001 | 347583001 |
| APPLICATION B | 908347802 | 908347802 |
| APPLICATION C | 493830004 | 491170055 |

# INFORMATION PROCESSOR, METHOD FOR CONTROLLING THE SAME, AND IMAGE FORMING SYSTEM

TECHNICAL FIELD

The present invention relates to an information processor, a method for controlling the information processor, and an image forming system, and, more specifically, relates to a network interface connectable to the image forming apparatus and an imaging forming system using the image forming apparatus.

BACKGROUND ART

Recently, networks, such as the Internet have been widely used, and printers are also often used via networks. Usually, for expensive printers, such as high-speed printers or color printers, a network interface is built into the printer. However, for inexpensive printers, such as monochrome printers, a network interface is not included in the main body of the printer and is generally provided separately as a network card module.

In such a case, the printer and the network card module are independent intelligent systems each having its own central processing unit (CPU). Usually, the network card module includes a print server function for overall control of various printer services via the network. The printer and the network card module provide desired services via a connecting interface. In this way, network services imposing high processing loads can be implemented in the network card module, and the performance required for the CPU of the printer and the peripheral devices can be reduced. As a result, the production cost for the printer can be reduced.

A known network interface for a printer, such as the line printer daemon protocol (LPR, whose standard is defined by RFC1179), is only required to transmit print data. However, recently, the demands for information management by printers have increased, and various means for managing information have been provided as additional functions of printers.

An example of the simplest form of such an additional function is a function for transmitting information management data (job language) to the port that receives print data. Since the job language shares a port with the print data, additional service ports are unnecessary. Thus, adding this function to the printer is relatively easy. However, there is a problem in that, if a large amount of print data is transmitted, the port will be occupied by the print data and the transmission of the information management data stops. Another problem is that, when the connection is unidirectional, such as the LPR connection in a network, the printer cannot obtain information to begin with.

Another method for managing information is to use the simple network management protocol (SNMP)/management information base (MIB) (RFC1157). According to this method, a standard SNMP is used to transmit data to a special port. This method, however, requires a proprietary special client program that is capable of receiving the SNMP and providing a user interface (UI). Moreover, since the SNMP is a protocol for communicating simple information, only a simple database including numbers and character strings can be provided to the printer. Therefore, data constituting a user interface including bitmap images describing the structure of the devices must be stored in a client program. As a result, a client program corresponding to each printer model must be provided.

Recently, the mainstream method for transmitting information has been shifting to a method using the hypertext transfer protocol (HTTP) (RFC1945 and RFC2616). According to this method, an HTTP service is provided by a network card module so as to enable the handling of Web content on information related to the printer, including hypertext markup language (HTML) data and bitmap data. The client (printer) uses a known web browser as a graphical user interface (GUI) to display and operate the Web content. In this way, a client program is not required. In previously proposed methods, various unique data (e.g., character strings of messages and bitmap images) had to be managed by a client program. However, in this method, the client (printer) only has to provide its model. This is suitable for producing printer products in a short period of time.

Unfortunately, the methods described above only provide static functions installed in the network card module in advance. Consequently, dynamic services, such as adding new functions or changing the control method of already-installed functions, cannot be added.

Taking these problems into consideration, a platform technology for running an application program written in Java® (a trademark by Sun Microsystems, Inc., USA; hereinafter this application program is referred to the "Java® application program") on a Java® virtual machine implemented in an apparatus, such as a printer, have been proposed. In this way, new functions can be added to the apparatus, i.e., the printer.

For example, there is a known multi-function apparatus capable of executing Java® application programs and capable of downloading Java® application programs. More specifically, a Java® application program operable on the multi-function apparatus is customized by a user so as to add new functions. The customized Java® application program is stored in a file server together with an identification (ID) number for identifying the user. When the multi-function apparatus is operated, it recognizes the ID number of the user and downloads the Java® application program corresponding to the user from the file server to the multi-function apparatus. In this way, additional functions are provided. (For example, refer to Japanese Patent Laid-Open No. 2000-298561.)

The Java® virtual machine for running the Java® application program includes application program interfaces (APIs) for providing various functions, such as a network communication function, required for controlling the apparatus. The Java® application program calls these APIs so as to control the apparatus and to process requests from the host computer connected to the apparatus.

The APIs provided as part of the Java® virtual machine include functions required for network communication and share the basic module for processing a network communication protocol. For this reason, the APIs provided as part of the Java® virtual machine are normally implemented in the network card module.

The usage of the APIs used by the Java® application program is unrestricted. Therefore, all APIs implemented in the network modules are available to all application programs. Accordingly, the Java® application program must restrict the available APIs for each application program.

DISCLOSURE OF INVENTION

The information processor according to the present invention is capable of restricting the available application program interface for each application program.

The information processor according to the present invention is capable of executing a predetermined application program and comprises at least one application program interface for providing predetermined control function for the application program, a determining unit for determining an available application program interface for the application program based on license information of the application program, and an operation controlling means for controlling the operation of the application program interface in accordance with the results determined by the determining unit.

The image forming system according to the present invention comprises an image forming apparatus; an information processor capable of executing a predetermined application, the information processor being detachable from the image forming apparatus; an image forming unit for generating and outputting image data based on input data; an application program interface for controlling the image forming unit for the application program; a determining unit for determining an available application program interface for the application program based on license information of the application program; and an operation controlling means for controlling the operation of the application program interface in accordance with the results determined by the determining unit.

An image forming system, comprises an image forming apparatus; an information processor detachable from the image forming apparatus and including a central processing unit separate from the image forming apparatus; at least one application program interface for controlling input to and output from the image forming apparatus; a storage unit for storing an application program supplied from outside in the image forming apparatus or the information processor and for storing the license information on the application program in both the image forming apparatus and the information processor; a determining unit for determining an available application program interface by extracting a description indicating at least one available application program interface from the license information of the application program when the application program is executed at the information processor; and an operation controlling unit for controlling the operation of the application program interface in accordance with the results determined by the determining unit.

The method for controlling an information processor capable of executing a predetermined application program, according to the present invention comprises the steps of determining an available application program interface for the application program based on license information of the application program and controlling the operation of the application program interface in accordance with the results determined by the determining unit, wherein the information processor includes at least one application program interface for providing predetermined control function for the application program.

A program for controlling a computer of an information processor capable of executing a predetermined application program, according to the present invention comprises at least one application program interface for providing predetermined control function for the application program, wherein the program enables the computer to function as a determining unit for determining an available application program interface for the application program based on license information of the application program, and wherein the program enables the computer to function as an operation controlling unit for controlling the operation of the application program interface in accordance with the results determined by the determining unit.

The recording medium readable by a computer, according to the present invention stores a program.

Further features and advantages of the present invention will become apparent from the following description of exemplary embodiments (with reference to the attached drawings).

BRIEF DESCRIPTION OF THE DRAWINGS

FIG. 3 illustrates the description of an application program that operates on a network print server;

BEST MODE FOR CARRYING OUT THE INVENTION

Embodiments of the present invention will now be described with reference to the drawings.

First Embodiment

Figure 1:
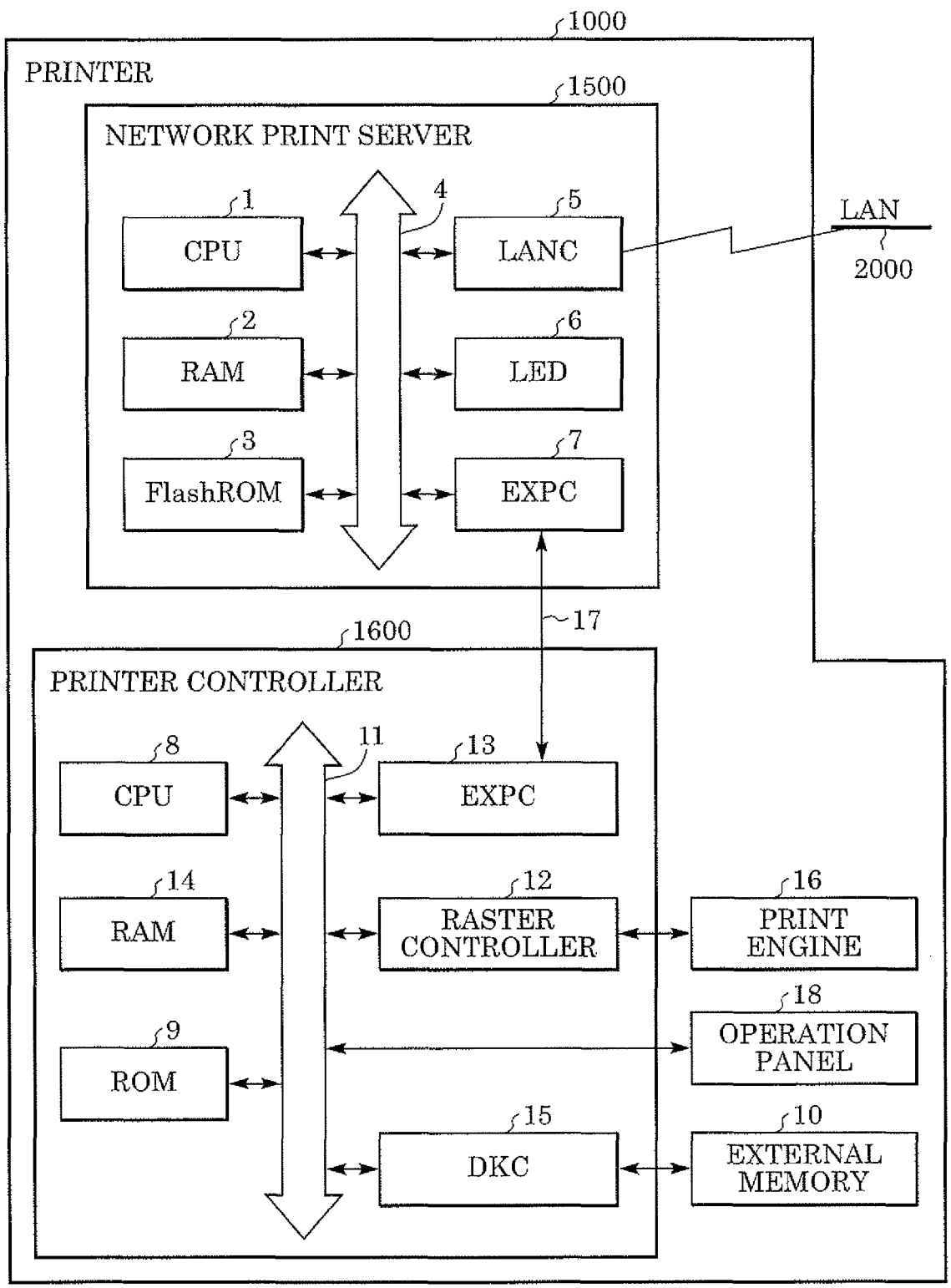
FIG. 1 is a block diagram of the hardware structure of a printer according to an embodiment of the present invention.

FIG. 1 is a block diagram illustrating the hardware structure of a printer 1000 having an information processor and an image forming system employing the information processor according to an embodiment of the present invention.

The printer 1000 comprises a network card module that is a network print server 1500 and a printer controller 1600. The printer 1000 includes an external memory 10, a print engine 16, and an operation panel (operation unit) 18.

The network print server 1500 comprises a central processing unit (CPU) 1, a random access memory (RAM) 2, a flash memory (Flash ROM) 3, a network controller (local area network controller (LANC)) 5, a light emitting diode (LED) 6, and an expansion interface controller (EXPC) 7, wherein all components are mutually connected to each other and are capable of communicating with each other via a system bus 4.

The CPU 1 executes a control program stored in the Flash ROM 3 to totally control each unit connected to the system bus 4. For example, the CPU 1 controls the printer 1000

(printer controller 1600) and controls the communication with a plurality of external apparatuses, for example, a host computer (not shown in the drawings), connected to a local area network (LAN) 2000.

For example, the CPU 1 performs overall control of various data transmission requests, such as print data and print control commands, sent from the plurality of external apparatus via the LANC 5 based on a control program. Then, the CPU 1 appropriately controls the data transfer to the connected printer controller 1600 via the EXPC 7. Communication with the external apparatuses connected to the LAN 2000 is carried out by using a predetermined network communication protocol. The RAM 2 functions as a main memory or, in other words, a temporary storage area, such as a work area, of the CPU 1.

The Flash RON 3 is a writable memory for storing control programs. A control program for the CPU 1 is stored in the Flash ROM 3 to enable processing as described below and illustrated in the flow charts in FIGS. 4, 5, and 6.

The LANC 5 enables bidirectional data transfer with the external apparatuses connected to the LAN 2000. The EXPC 7 enables bidirectional data transfer with the printer controller 1600.

The LED 6 is used as a display for indicating the operational state of the network print server 1500. The LED 6 is capable of indicating various operational statuses, such as the electrical connection (LINK) between the LAN 2000 and the LANC 5 and the network communication mode (such as 10BaseT, 100Base TX, full duplex, or half duplex), by changing its blinking pattern or color.

The printer controller 1600 comprises a CPU 8, a RAM 14, a read only memory (ROM) 9, a raster controller 12, an expansion interface controller (EXPC) 13, and a disk controller (DKC) 15, wherein all components are mutually connected to each other and are capable of communicating with each other via a system bus 11.

The CPU 8 performs overall control of various devices connected to the system bus 11 based on control programs stored in the ROM 9 or control programs and #resource data stored in the external memory 10 connected via the DKC 15.

For example, the CPU 8 receives print data from the network print server 1500 connected via the EXPC 13 based on a control program. Then, based on the received print data, the CPU 8 generates output image data at the raster controller 12 and outputs an image signal to the print engine 16.

The ROM 9 stores the control programs for the CPU 8.

The RAM 14 functions as a main memory and a work area for the CPU 8. The memory capacity of the RAM 14 can be expanded by an optional RAM connected to an expansion port (not shown in the drawings).

The raster controller 12 receives print data from the network print server 1500. Then, the raster controller 12 generates output image data based on the received print data and outputs an image signal. The EXPC 13 enables bidirectional data transfer with the network print server 1500.

The network print server 1500 and the printer controller 1600 are connected via an expansion interface 17. The expansion interface 17 includes connectors (not shown in the drawings) for detachably connecting the network print server 1500 and the printer controller 1600. The expansion interface 17 can connect the network print server 1500 to another printer having the same structure as the printer 1000 (for example, a printer of a different model).

The print engine 16 uses a known printing technology, such as electrography (laser beam printing), inkjet printing, or sublimatic (thermal transfer) printing, to form an image in accordance with the image signal sent from the raster controller 12.

The operation panel 18 includes buttons for commanding operations, such as setting operational modes for the printer 1000 and deleting print data, and a display, such as a liquid crystal panel or an LED, for indicating the operational status of the printer 11000.

Figure 2A:
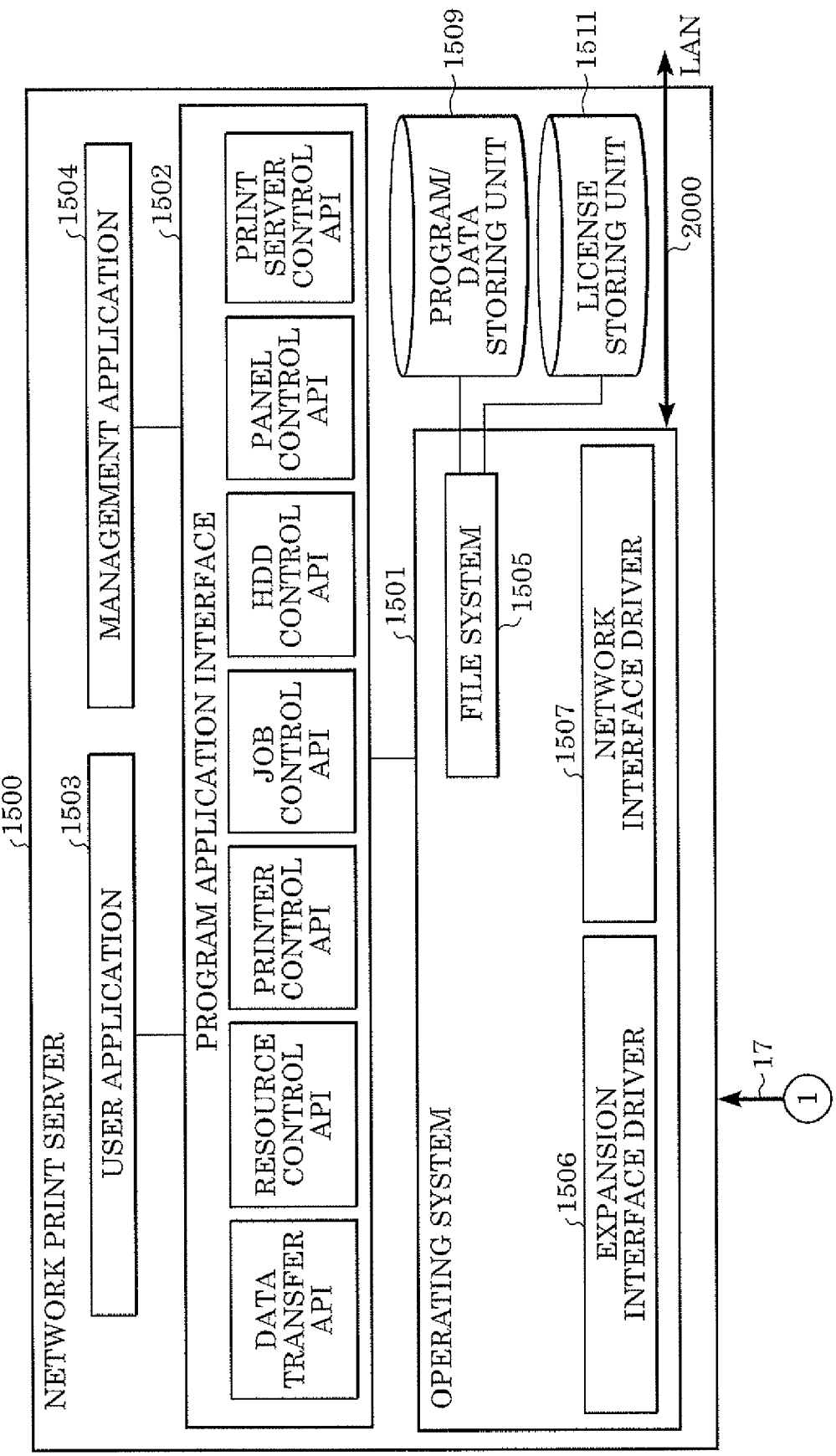
FIGS. 2A and 2B are block diagrams of the software structure of a printer according to an embodiment of the present invention.
Figure 2B:
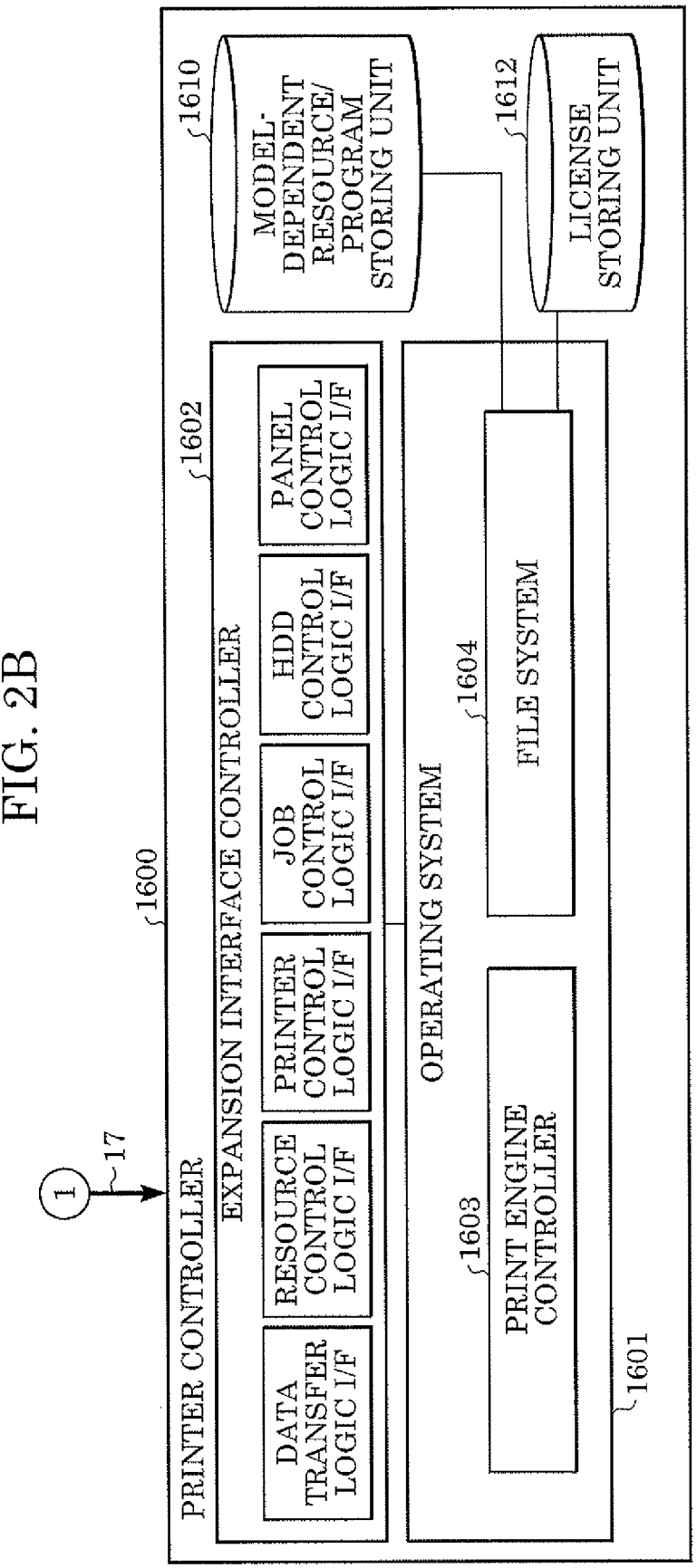

FIGS. 2A and 2B are block diagrams of the software structure of control programs stored in each storage device included in the network print server 1500 and the printer controller 1600, which are both control devices, included in the printer 1000 according to this embodiment of the present invention. Each control program is analyzed and processed by the CPUs 1 and 8 of each control device.

FIGS. 2A and 2B illustrate an operating system 1501 for controlling the input and output of basic data of the network print server 1500. The operating system 1501 includes a file system 1505, an expansion interface driver 1506, and a network interface driver 1507.

The file system 1505 controls the input and output of data between a program/data storing unit 1509 and a license storing unit 1511. The program/data storing unit 1509 stores application programs and resource data, which are common data independent from the model of the printer 1000. The license storing unit 1511 stores the license codes (license information) of the application programs.

The expansion interface driver 1506 controls data communication between the network print server 1500 and the printer controller 1600 via the expansion interface 17. The network interface driver 1507 controls communication between the network print server 1500 and the external apparatuses via the communication medium of the LAN 2000.

Application program interfaces (APIs) 1502 provide various controlling functions of the operating system 1501 to a user application 1503 operating on the network print server 1500 and application programs, such as a management application 1504 for registering and managing the user application 1503.

The APIs 1502 include a data transfer API, a resource control API, a printer control API, a job control API, a print server control. API, a hard disk (HDD) control API, and a panel API.

The data transfer API provides a print-data transmitting function. The resource control API controls the input and output of resource data, such as bitmap images and display messages. The print control API controls restarting of the printer 1000 and initializes and sets setting values. The job control API carries out control such as canceling a print job and re-commanding a print job. The print server control API restarts the network print server 1500, initializes and sets the setting values of the network print server 1500, and starts up, registers, and deletes application programs. The HDD control API writes to and reads from the hard disk drive. The panel control API switches the display on the operation panel 18.

An operating system 1601 performs overall control of various processes carried out by the printer controller 1600. The operating system 1601 includes a print engine controller 1603 and a file system 1604.

The print engine controller 1603 controls the communication between the printer controller 1600 and the print engine 16. The file system 1604 controls the input and output of data between a model-dependent resource/program storing unit 1610 and a license storing unit 1612. The model-dependent resource/program storing unit 1610 stores application programs and resource data dependent on the model of the printer 1000, such as model-dependent resources including bitmap images and error messages referred to by the network print server 1500, and model-dependent application programs operable on the network print server 1500. The license storing unit 1612 stores the license code (license information) on the application programs.

An expansion interface controller 1602 controls the communication between the printer controller 1600 and the network print server 1500 via the expansion interface 17. The expansion interface controller 1602 includes a data transfer logic interface, a resource control logic interface, a printer control logic interface, a job control logic interface, a hard disk (HDD) control logic interface, and a panel control logic interface. The expansion interface controller 1602 transfers a command requested by the network print server 1500 to the operating system 1601 via each logic interface and then sends the processing results to the network print server 1500.

The data transfer logic interface controls the input and output of print data for each type of control and controls the input and output of various data stored in the model-dependent resource/program storing unit 1610. The printer control logic interface carries out control such as restarting the printer 1000 and initializing and setting the setting values. The job control logic interface carries out control such as canceling a print job and re-commanding a print job. The HDD control logic interface controls the hard disk drive. The panel control logic interface controls the operation panel 18.

FIG. 3 illustrates a description of an application program operable on the network print server 1500. As an example, the application program is written in Java®.

In FIG. 3, "result=printer.outdata("Test");" (row 301) is a command for calling the data transfer API, described above with reference to FIGS. 2A and 2B. The character string "printer.outdata("Test")" commands the data transfer API to send out the text data named "Test" and send this text data to the print engine 16 via the printer controller 1600 as print data so that the data is printed at the print engine 16. Then, the result of this processing is stored in "result" as numerical (integer) data.

In FIG. 3 "System.out.println("Result="+result);" (row 302) is a command for transferring the results of the processing commanded in row 301 and converting these results into a text message and displaying it on the standard output (for example, on a display (liquid crystal panel) of the operation panel 18 of the printer 1000 or on a browser display of the host computer, which is the caller of the application).

Figure 4:
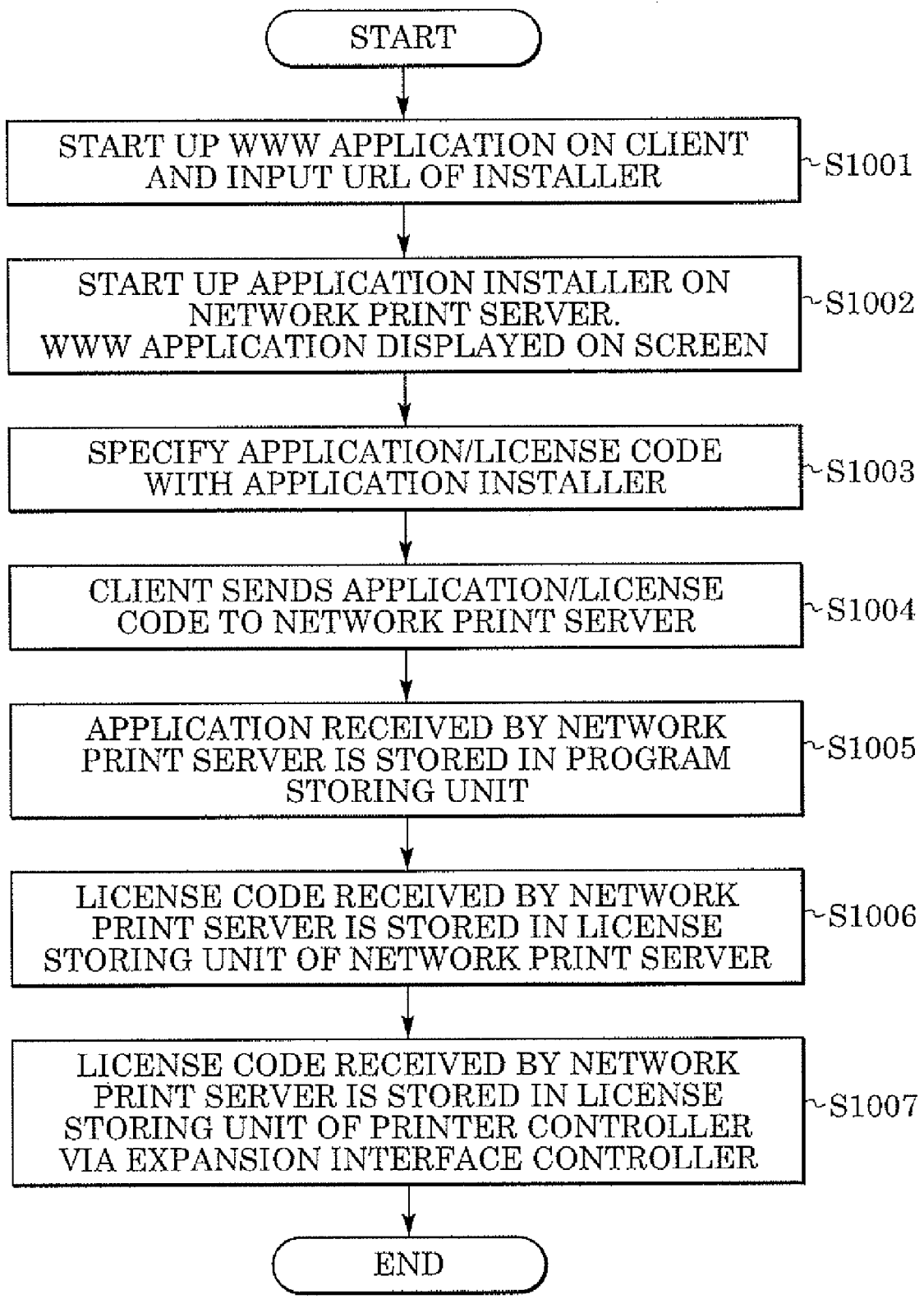
FIG. 4 is a flow chart illustrating a process of an installer of an application program that operates on a network print server according to an embodiment of the present invention.

FIG. 4 is a flow chart illustrating a process carried out by an installer of an application program operable on the network print server 1500 according to this embodiment.

In Step S1001, a World Wide Web (WWW) application (e.g., WWW browser) is started up on a client (external apparatus) of a host computer. Then, the uniform resource locator (URL) of the application installer operable on the network print server 1500 is input to this WWW application. In this way, the network print server 1500 can be accessed by the client.

In Step S1002, the network print server 1500, accessed by the client, starts up the application installer. Then, the network print server 1500 sends the data for displaying the application installer screen, which includes a file name entry box 1101 for the application program, a license code entry box 1102 for the application program, and an OK button 1103, as described in FIG. 5, to the client so that the client displays the application installer screen on the WWW application (i.e., the display of the client).

In Step S1003, the file name and license code corresponding to the application to be installed are input to the entry boxes 1101 and 1102, respectively, via the application installer screen. In Step S1004, after the file name and the license code of the application are input and the OK button 1103 is clicked, the client sends the application program and the license code to the network print server 1500.

In Step S1005, the network print server 1500 stores the received application program in the program/data storing unit 1509 or the model-dependent resource/program storing unit 1610 of the printer controller 1600.

Figures 5, 6:
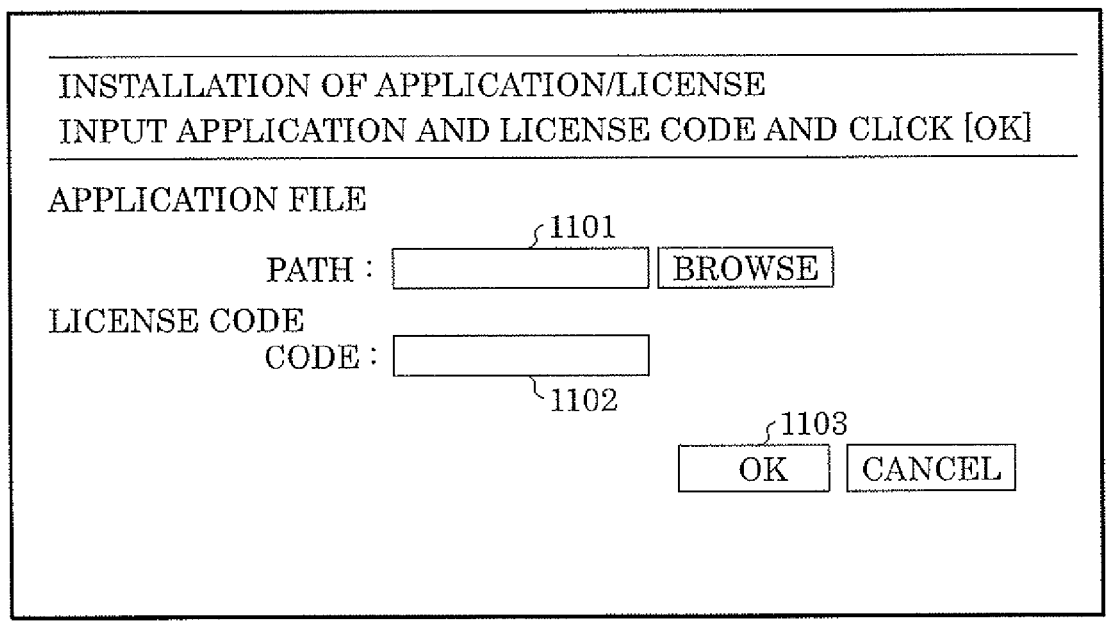
FIG. 5 illustrates an example of a screen for an application installer.
FIG. 6 illustrates an example of a license code file.

In Step S1006, the network print server 1500 stores the received license code in the license storing unit 1511 in a manner such as that illustrated in FIG. 6. Then, in Step S1007, the network print server 1500 stores the license code in the license storing unit 1612 of the printer controller 1600 via the expansion interface controller 1602. The license code stored in the license storing unit 1612 is in the same form as the license code stored in the license storing unit 1511.

Figure 7:
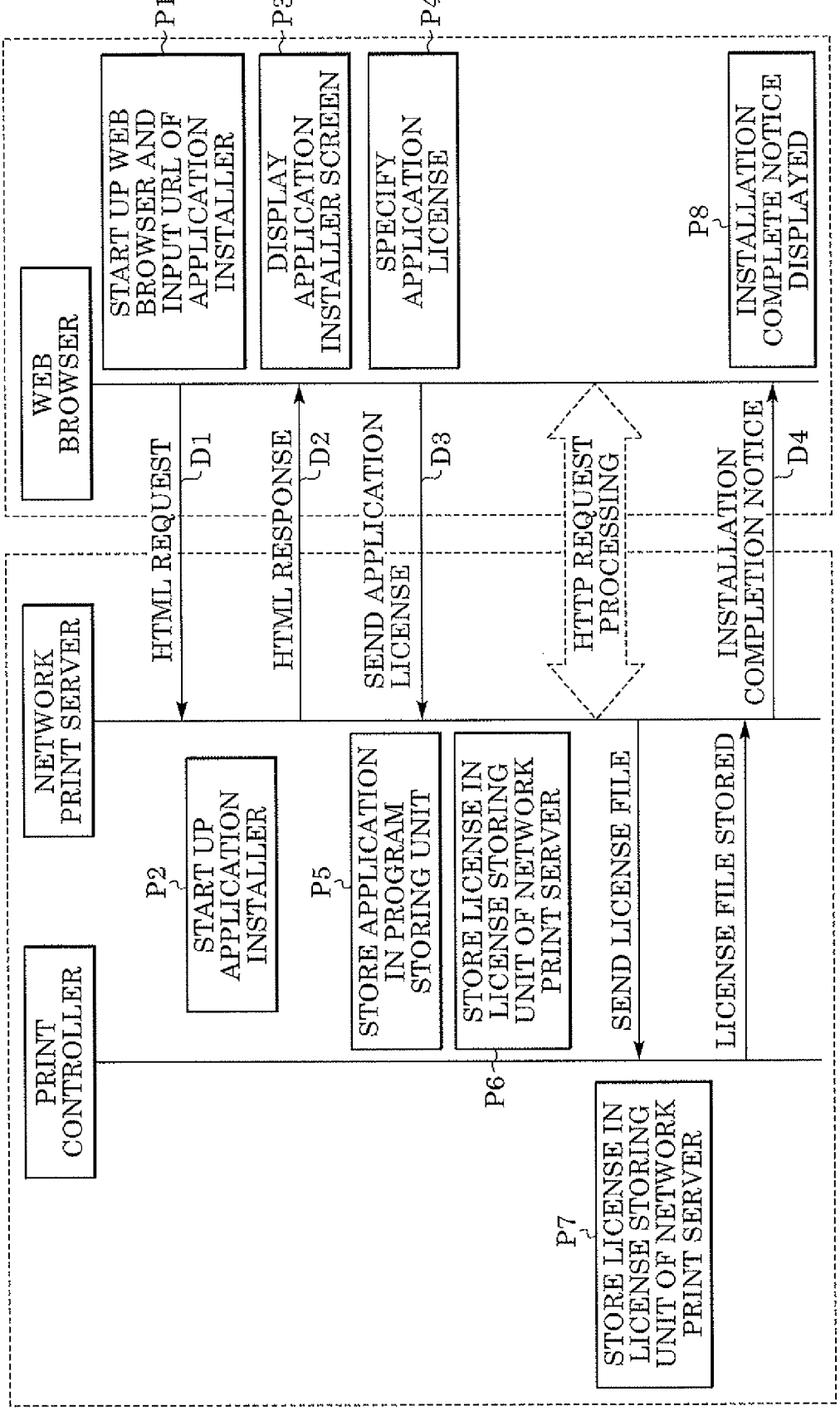
FIG. 7 illustrates the installation steps of an application program according to an embodiment of the present invention.

FIG. 7 illustrates the steps of the installation process of an application program illustrated in FIG. 4. In FIG. 7, the client is a host computer.

A WWW application, such as a Web browser, is started up on the client. By inputting the URL of the application installer operable on the network print server 1500 (P1), the host computer issues an HTML request D1 and accesses the network print server 1500. After receiving the HTML request D1 from the client, the network print server 1500 starts up the application installer (P2) and sends back an HTML response D2 in response to the HTML request D1. According to this HTML response D2, the application installer screen is displayed on the client (P3).

After inputting the application name and license code of the application to be installed via the application installer screen on the client and clicking on the OK button (P4), the client sends the application program and the license code D3 to the network print server 1500.

After receiving the application program and the license code, the network print server 1500 stores the received application program in the model-dependent resource/program storing unit 1610 of the printer controller 1600 or in the program/data storing unit 1509 of the network print server 1500 (P5).

The network print server 1500 stores the received license code in the license storing unit 1511 of the network print server 1500 (P6). Furthermore, the network print server 1500 stores the same license code in the license storing unit 1612 of the printer controller 1600 via the expansion interface controller 1602 (P7).

After each piece of data is stored, as described above, the network print server 1500 sends a notice D4 to the client informing that the installation has been completed. Then, the completion of the installation is indicated on the WWW application on the client (P8).

Figure 8:
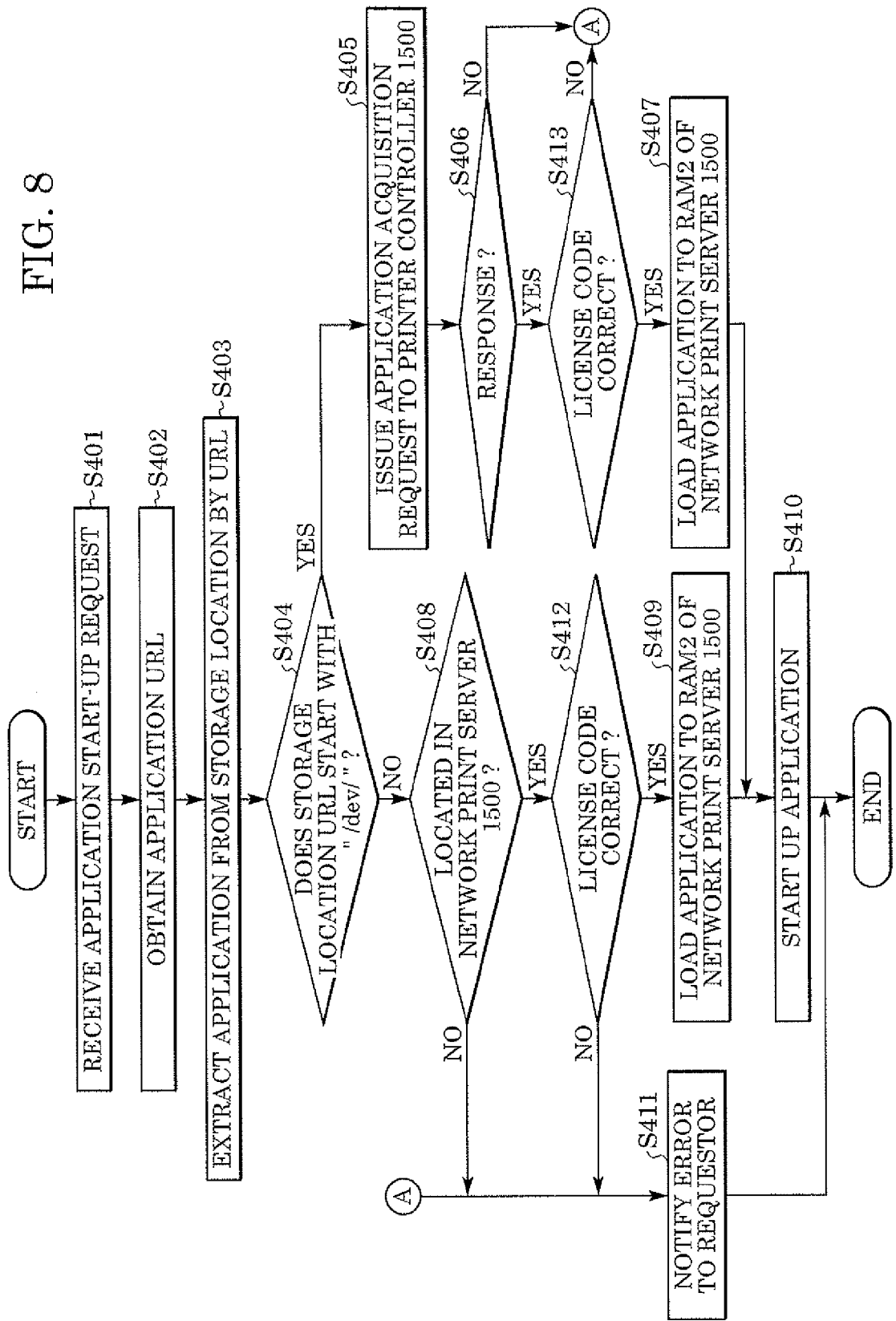
FIG. 8 is a flow chart illustrating a start-up process of an application program that operates on a network print server according to an embodiment of the present invention.

FIG. 8 is a flow chart illustrating the start-up process of an application program operable on the network print server 1500 according to this embodiment. The flow chart in FIG. 8 illustrates the process carried out when the printer 1000 receives an application program start-up request from an external apparatus, such as a host computer, connected to the LAN 2000. The control program for controlling the process illustrated in FIG. 8 is stored in the Flash ROM 3 of the network print server 1500, as described above.

After the network print server 1500 receives an application program start-up request command from an external apparatus via the LAN 2000 (Step S401), the network print server 1500 obtains the URL for the storage location of the application program from the start-up request command (Step S402).

Subsequently, the network print server 1500 extract the information on the storage location of the application program from the URL obtained in Step S402 (Step S403). For example, if the obtained URL is "http://192.168.0.215/abc/xyz.java", "/abc/xyz.java" indicates the information on the storage location, "http:" is the protocol, and "192.168.0.215" is the network address for the printer 1000.

The network print server 1500 determines whether or not the character string of the storage location begins with "/dev/" (Step S404).

If the character string of the storage location begins with "/dev/", the network print server 1500 determines that the storage location of the application program requested to be started up is in the printer controller 1600. Then, the network print server 1500 uses an API, such as those illustrated in FIGS. 2A and 2B, to issue a request to the printer controller 1600 so as to obtain the application program (Step S405).

Subsequently, the network print server 1500 checks the response from the printer controller 1600 (Step S406). If the requested application program is obtained, the network print server 1500 reads out the license code for the application stored in the license storing unit 1612 of the printer controller 1600 and compares this license code with the license code stored in the license storing unit 1511 so as to determine whether or not the two license codes match (Step S413).

If the license codes do not match, the network print server 1500 determines that the application program is invalid and sends an error message back to the external apparatus, which is the source of the application start-up request command (Step S411). Then, the process is terminated. On the other hand, if the license codes match, the network print server 1500 determines that the application program as being valid and loads the application program into the RAM 2 of the network print server 1500 (Step S407). Subsequently, the application program is started up (Step S410), and then the process is completed.

If the requested application program cannot be obtained from the printer controller 1600 in Step S406, the network print server 1500 sends an error message back to the external apparatus, which is the source of the application start-up request command (Step S411). Then, the process is completed.

As a result of Step S404, if the character string of the storage location is determined not to begin with "/dev/", the network print server 1500 determines whether or not the corresponding application program is stored in the program/data storing unit 1509 (Step S408). If the network print server 1500 determines that the application is stored in the program/data storing unit 1509, the network print server 1500 reads out the license code of the application stored in the license storing unit 1612 and checks whether or not the license code matches with the license code stored in the license storing unit 1511 (Step S412).

If the license codes do not match, the network print server 1500 determines that the application program is invalid and sends an error message back to the external apparatus, which is the source of the application start-up request command (Step S411). Then, the process is terminated. On the other hand, if the license codes match, the network print server 1500 determines that the application program is valid and loads the application program to the RAM 2 of the network print server 1500 (Step S409). Subsequently, the application program is started up (Step S410), and then the process is terminated.

As a result of Step S408, if the network print server 1500 determines that the requested application program is not stored in program/data storing unit 1509, the network print server 1500 sends an error message back to the external apparatus, which is the source of the application start-up request command (Step S411). Then, the process is completed.

Figure 9:
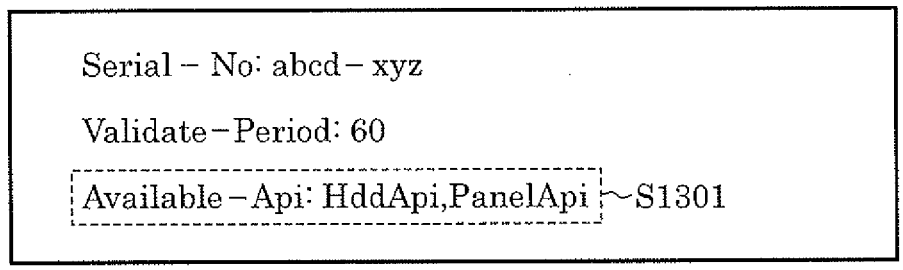
FIG. 9 illustrates an example of a license code.

FIG. 9 illustrates examples of a license code.

In FIG. 9, "Available-Api:HddApi,PanelApi" (row S1301) indicates the APIs that can be used by the application program corresponding to the license code. The character string "HddApi" represents the HDD control API and "PanelApi" represents the panel control API. In other words, the license code illustrated in FIG. 9 indicates that the HDD control API and the panel control API of the network print server 1500 are the only APIs available.

Figure 10:
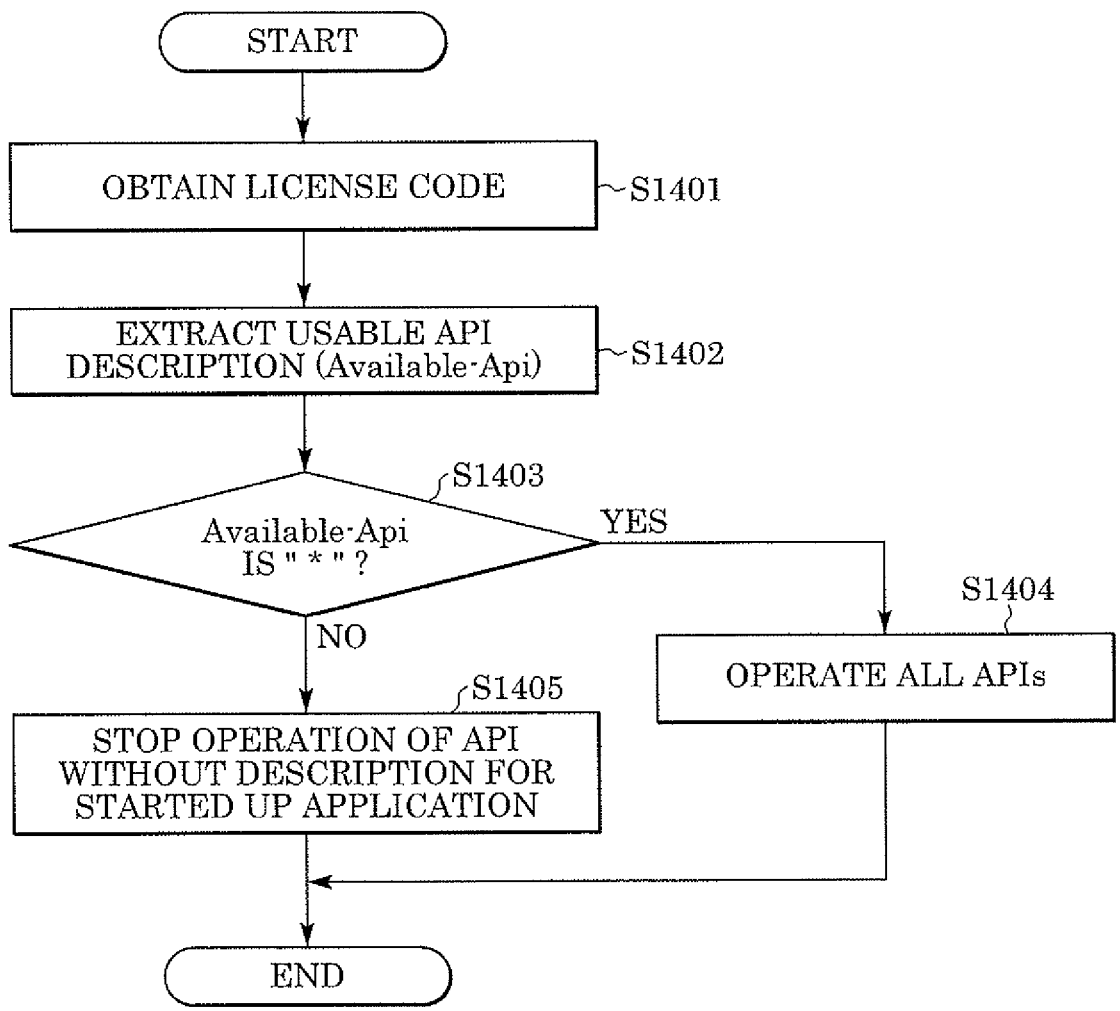
FIG. 10 is flow chart illustrating a process for extracting information on available APIs from a license code of an application program.

FIG. 10 is a flow chart illustrating the process for extracting information on the available APIs from the license code of the application program when the application program is started up.

In Step S1401, the network print server 1500 obtains the license code stored in the license storing unit 1511. Subsequently, in Step S1402, the network print server 1500 extracts a description on the available APIs from the license code obtained in Step S1401 (for example, the character string "Available-Api" in FIG. 9).

In Step S1403, the network print server 1500 determines whether or not the description of the available API ("Available-Api") extracted in Step S1402 is marked by an asterisk "*" indicating that all APIs are available. If the API description is marked by an asterisk "*", the process proceeds to Step S1404 and operations of all APIs are permitted for the application program. Then, the process is completed. On the other hand, if the description of the available API is marked by an asterisk "*" and the available APIs are specified, the process proceeds to Step S1405, where operation of the unspecified APIs is forbidden (i.e., the operation of only the specified APIs is permitted). Then, the process is completed.

Figure 11:
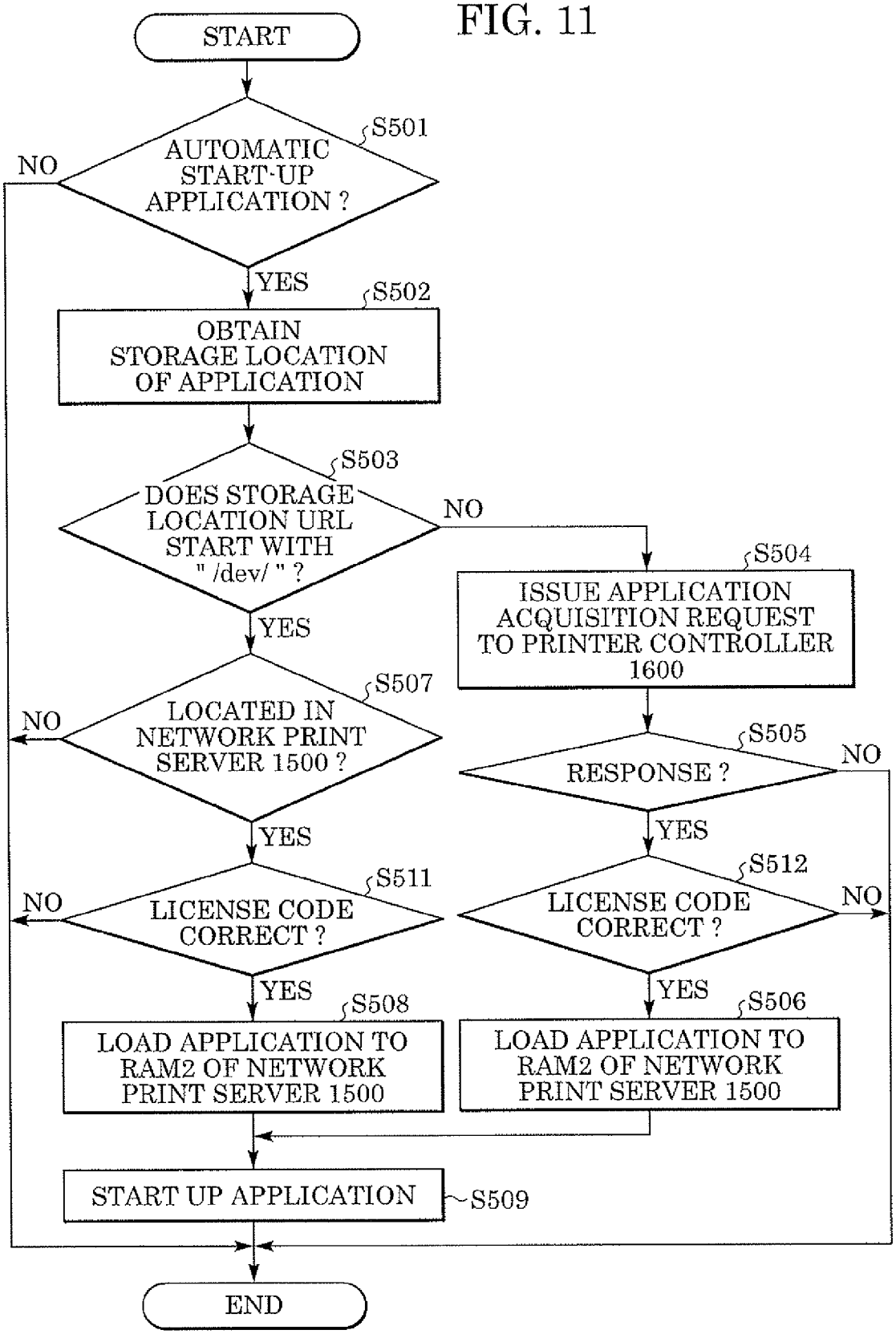
FIG. 11 is a flow chart of another start-up process of an application program that operates on a network print server according to an embodiment of the present invention.

FIG. 11 is a flow chart illustrating another start-up process of an application program operable on the network print server 1500 according to this embodiment. FIG. 11 illustrates the process for starting up an application program assigned as an automatic start-up application stored in a predetermine storage area of the network print server 1500. In this process the automatic start-up application is started up when the printer 1000 is started up. The control program for controlling the process illustrated in FIG. 11 is stored in the Flash ROM 3 of the network print server 1500, as described above.

When the printer 1000 is restarted by turning the power on or by resetting the printer 1000, the network print server 1500 determines whether or not information on the storage location of an automatic start-up application program is stored in a predetermined storage area (Step S501). If this information is stored, the network print server 1500 obtains this storage location information (Step S502) and determines whether or not the character string of the storage location begins with "/dev/" (Step S503).

If the character string of the storage location begins with "/dev/", the network print server 1500 determines that the storage location of the application program to be automatically started up is in the printer controller 1600. Then, an API, as illustrated in FIGS. 2A and 2B, is used to issue a request to the printer controller 1600 so as to obtain the application program (Step S504).

Subsequently, the network print server 1500 checks the response of the printer controller 1600 (Step S505). As a result, if the requested application program is obtained, the network print server 1500 reads out the license code for the application stored in the license storing unit 1612 of the printer controller 1600 and compares this license code with the license code stored in the license storing unit 1511 to determine whether or not the two license codes match (Step S512).

If the license codes do not match, the network print server 1500 determines that the application program is invalid and immediately terminates the process. On the other hand, if the license codes match, the network print server 1500 determines that the application program is valid and loads the application program into the RAM 2 of the network print server 1500 (Step S506). Subsequently, the application program is started up (Step S509), and then the process is completed.

If the requested application program cannot be obtained from the printer controller 1600 in Step S505, the process is immediately terminated.

As a result of Step S503, if the character string of the storage location is determined not to begin with "/dev/", the network print server 1500 determines whether or not the application program is stored in the program/data storing unit 1509 in the network print server 1500 (Step S507). If the network print server 1500 determines that the application is stored in the program/data storing unit 1509, it reads out the license code of the application stored in the license storing unit 1612 and checks whether or not the license code matches with the license code stored in the license storing unit 1511 (Step S511).

If the license codes do not match, the network print server 1500 determines that the application program is invalid and immediately terminates the process. On the other hand, if the license codes match, the network print server 1500 determines that the application program is valid and loads the application program into the RAM 2 of the network print server 1500 (Step S508). Subsequently, the application program is started up (Step S509), and then the process is completed.

As a result of Step S507, if the network print server 1500 determines that the requested application program is not stored in the program/data storing unit 1509, the process is immediately terminated.

Also, if the network print server 1500 determines that the storage location information of the application to be automatically started up is not stored in the predetermined storage area, the process is immediately terminated (Step S501).

When the application program is started up in Step S509 as illustrated in FIG. 11, a process for controlling the operation of the APIs by determining the available APIs is carried out based on the process illustrated in FIG. 10 in which the license code of the application program is checked.

Figure 12:
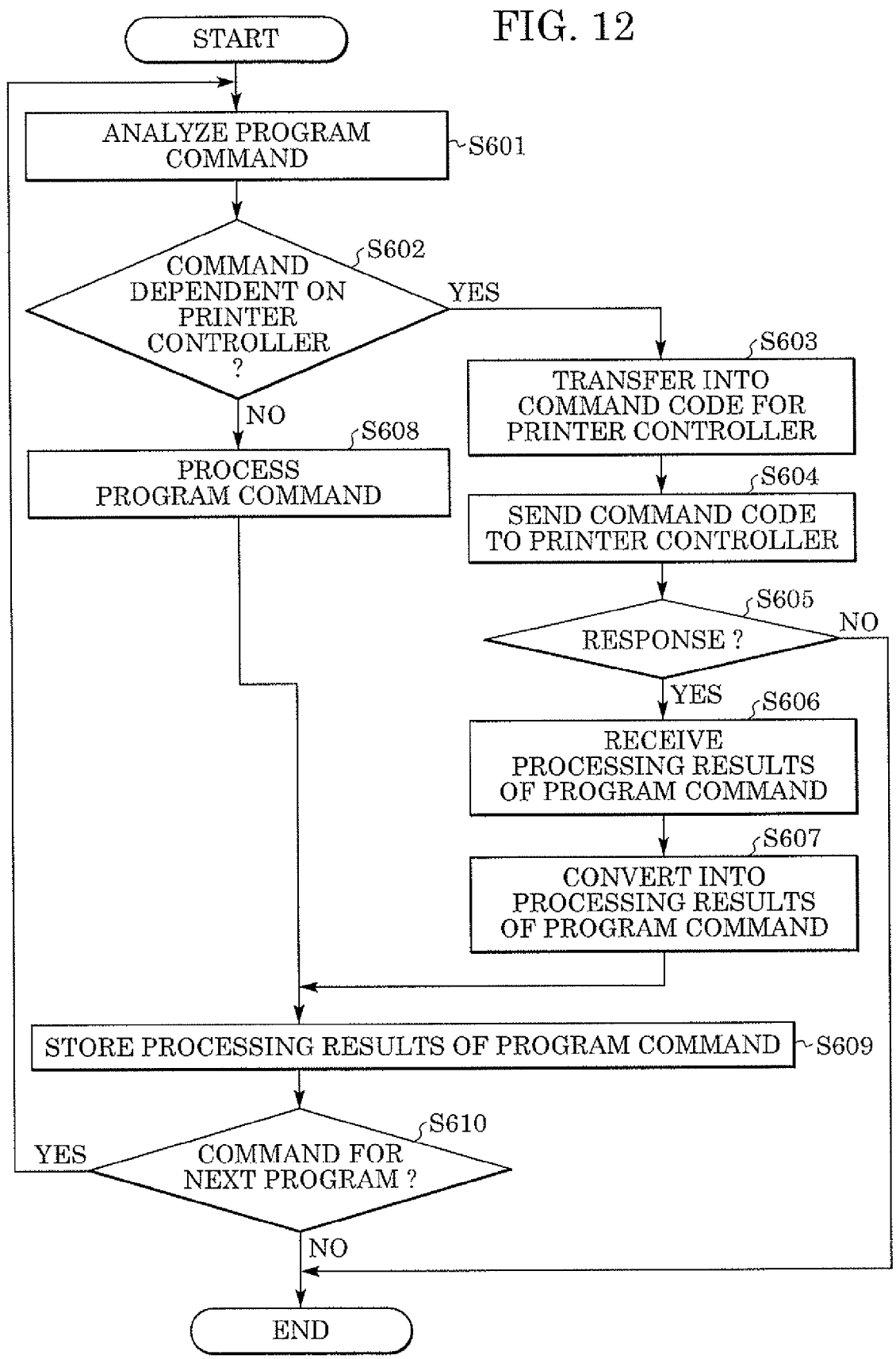
FIG. 12 is a flow chart illustrating a commanding process of an application program that operates on a network print server according to an embodiment of the present invention.

FIG. 12 is a flow chart illustrating the procedure for processing a command included in the application program operating on the network print server 1500 according to this embodiment. The control program for carrying out the control process illustrated in FIG. 12 is stored in the Flash ROM 3 of the network print server 1500, as described above.

When the application program is started up in accordance with the process illustrated in the flow chart of FIG. 8 or 11, the network print server 1500 reads out a command included in the application program and analyzes this command (Step S601). Subsequently, the network print server 1500 determines whether or not the read out command is dependent on the printer controller 1600 based on the type of command (Step S602).

Figure 13:
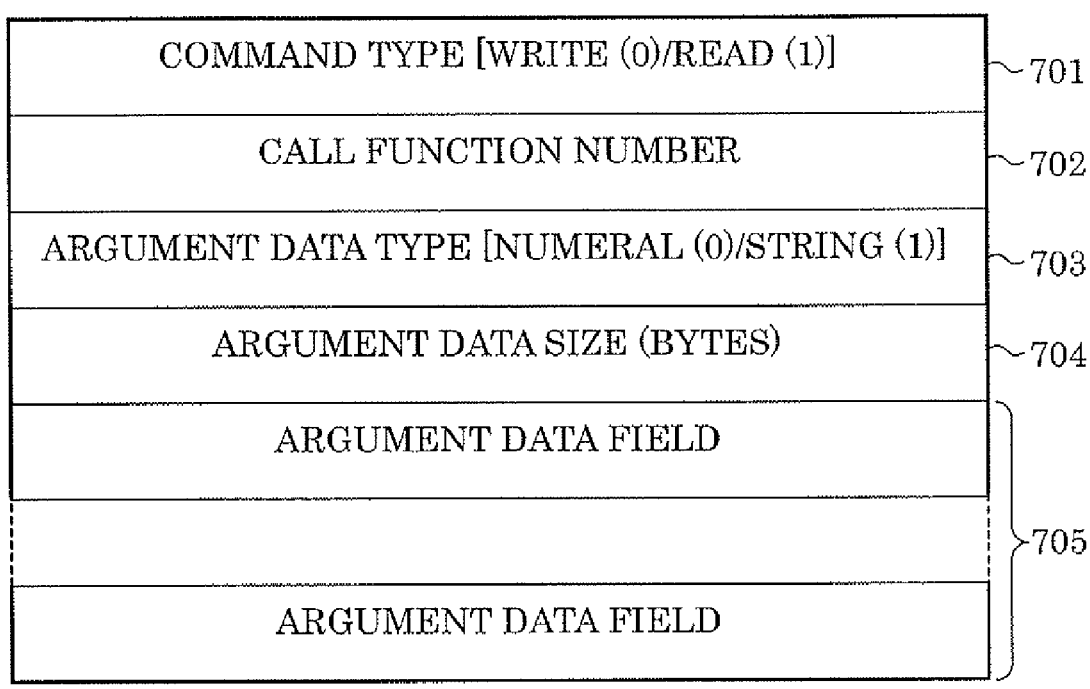
FIG. 13 is an example of command format for a printer controller.

In Step S602, if the command is determined as being dependent on the printer controller 1600, the network print server 1500 converts the command code in accordance with the command format of the printer controller 1600, as illustrated in FIG. 13 (Step S603). The network print server 1500 sends this converted command code to the printer controller 1600 via the expansion interface 17 (Step S604).

FIG. 13 illustrates an example of a command format of the printer controller 1600.

In FIG. 13, a first field 701 indicates the type of command. If the command is a write command, the field value is "0", and, if the command is a read command, the field value is "1". A unique number (call function number) is assigned for a second field 702 defined in advance for each control function provided by the printer controller 1600.

A third field 703 indicates the data type of argument data, described below. If the argument is a numeral, the field value is "0", and if the argument is a character string, the field value is "1". A fourth field 704 indicates the size of the argument data for the argument assigned to the calling function. A fifth field 705 defines the argument assigned to the calling function.

Referring back to FIG. 12, the network print server 1500 determines whether or not the printer controller 1600 responds to the transmitted command code (Step S605). If the printer controller 1600 responds, the network print server 1500 receives the results of the processing by the printer controller 1600 (Step S606). The results sent back from the printer controller 1600 and received by the network print server 1500 in Step S606 are in a format illustrated in FIG. 14.

Figure 14:
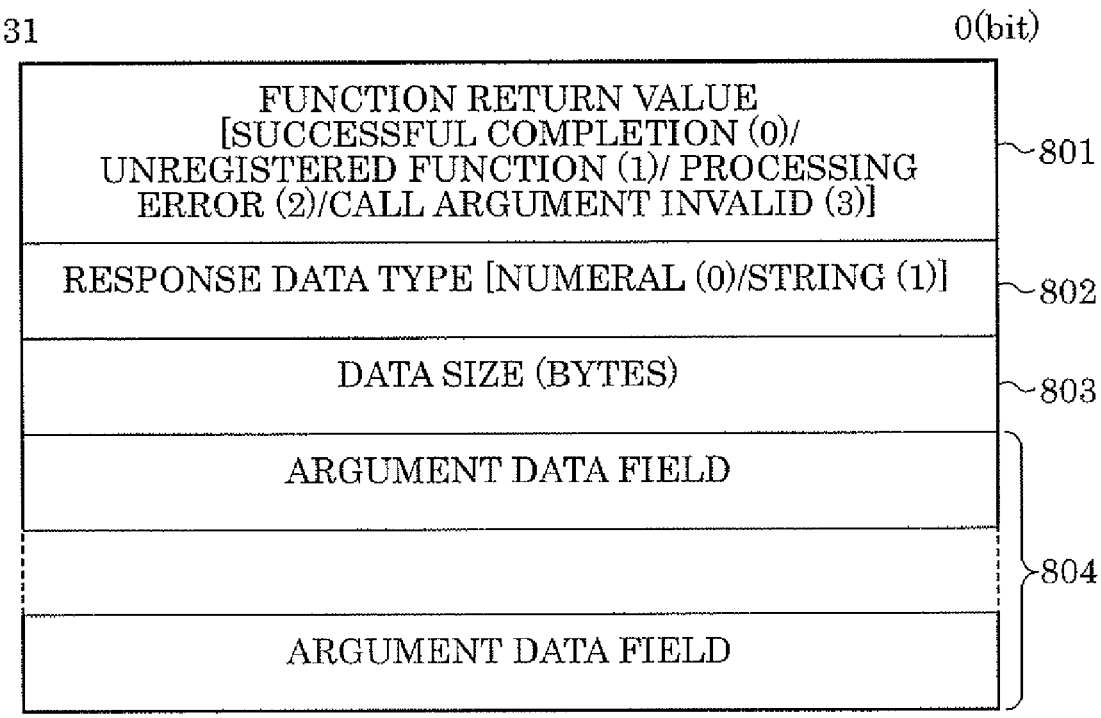
FIG. 14 is an example of the format of a processing result sent back from a printer controller.

FIG. 14 illustrates an example of the processing results sent back from the printer controller 1600.

In FIG. 14, a first field 801 indicates the return value according to the processing result. The field value is "0" if the command is processed successfully; the field value is "1" if the calling function number of the command is an unregistered function number; the field value is "2" if the processing of command is unsuccessful (an error); and the field value is "3" if the argument data of the command is an invalid value.

A second field 802 indicates the data type of the response data. If the response data is a numeral, the field value is "0", and if the response data is a character string, the field value is "1". A third field 803 indicates the size of the response data for the argument assigned to the calling function. A fourth field 804 defines the response data.

Referring back to FIG. 12, the network print server 1500 converts the processing results received in Step S606 back to the format of the original program command (Step S607), and then stores the processing result of the program command in a predetermined memory space (Step S609). The network print server 1500 confirms whether or not there is a subsequent program command (Step S610). If there is a subsequent program command, the process returns to Step S601 and the steps after Step S602 are repeated. If there is no subsequent program command, the process is completed.

In Step S605, if the printer controller 1600 does not respond to the transmitted command code for a predetermined amount of time, the process is immediately terminated.

If the command type is determined to be independent from the printer controller 1600 in Step S602, the network print server 1500 carries out a process in accordance with the command (Step S608) and stores the results of the process in a predetermined memory space (Step S609). Then, the process proceeds to Step S610.

As described above, according to this embodiment, information on APIs available for an application program is extracted from a license code (license information) of the application program to determine and operate the available APIs. In this way, the available APIs can be assigned for each application program in advance, and the usage of APIs can be restricted.

By storing an application program that is dependent on the printer 1000 in the model-dependent resource/program storing unit 1610 of the printer controller 1600, instead of the program/data storing unit 1509 of the network print server 1500, an application program that only operates on a different printer model can be prevented from being mistakenly started up.

By starting up the application program only when the license codes of the application program stored in the license storing units 1511 and 1612 of the network print server 1500 and the printer controller 1600, respectively, match, the appropriate application program can be reliably started up.

The model-dependent and model-independent (shared) data of the application programs and the resource data are stored separately. More specifically, the application programs and the resource data that are independent from the printer 1000 are stored in the program/data storing unit 1509 in the network print server 1500, whereas the application programs and the resource data that are dependent on the printer 1000 are stored in the model-dependent resource/program storing unit 1610 of the printer controller 1600. In this way, the memory capacity required by the network print server 1500 can be reduced and the memory areas included in the network print server 1500 and the printer controller 1600 can be used efficiently and independently.

When executing the application program, the actual processing for each command included in the application program is carried out by the network print server 1500 or the printer controller 1600 depending on the type of command. In this way the command can be processed efficiently.

According to this embodiment, when the network print server 1500 checks for the storage location of the application program, as illustrated in FIGS. 8 and 11, the storage location is determined based on whether or not the character string "/dev/" is included in the information on the storage location. It is, however, inappropriate to indicate the storage location in the URL of the storage location when the storage location of the application program must be hidden as internal information.

To resolve this problem, a table including the storage location for each application program may be provided in advance, and the storage location of an application program can be determined based on this table. In this way, the storage location does not have to be indicated by a character string and the storage location can be hidden.

In this embodiment, as described above, available APIs are indicated by including information on the operable APIs in the license code of the application program. However, information on the inoperable APIs may be included in the license code of the application program to indicate the available APIs. Moreover, in this embodiment, the printer 1000 was described. However, the application of the present invention is not limited to a printer and may be applied to an image forming apparatus including a multi-function apparatus.

Another Embodiment

The scope of the present invention also includes software program codes for realizing the functions according to the first embodiment by operating various devices. The software program codes are supplied to a computer included in an apparatus or a system connected to the various devices. The various devices are operated in accordance with the software program codes executed by the computer (CPU or micro processing unit (MPU)) of the apparatus or system.

In this case, the software program codes realize the functions of the first embodiment, and, thus, the software program codes are included in the scope of the present invention. Moreover, the supplying means for supplying the software program codes, for example, a recording medium storing the software program codes, is also included in the scope of the present invention. The recording medium may be a flexible disk, a hard disk, an optical disk, a magneto-optical disk, a compact disk read only memory (CD-ROM), a magnetic tape, a non-volatile memory card, or a ROM.

The software program codes are included in the scope of the present invention when the functions of the first embodiment are realized by a computer executing the supplied software program codes and when the functions of the first embodiment are realized cooperatively by an operating system (OS) operating on a computer and other application software.

The software program codes are included in the scope of the present invention also when the functions of the first embodiment are realized by storing the software program codes in a memory included in a function expansion board of a computer or a function expansion unit connected to a computer and carrying out the entire process or part of the process according to the software program codes by a CPU of the function expansion board or the function expansion unit.

According to the present invention, available application program interfaces are determined based on the license information of the application programs. The operation of an application program interface is controlled according to the results of the available application program interfaces. In this way, available application program interfaces for each application program may be assigned and the usage of the application program interfaces can be restricted.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-071170 filed Mar. 12, 2004, which is hereby incorporated by reference herein.

The invention claimed is:

1. An information processor capable of executing plural application programs, comprising:

plural application program interfaces (APIs), each configured to provide to a given application program of the plural application programs, one of plural control functions provided in the information processor by being called by the given application program;

a license information storing unit configured to store license information, wherein the license information includes information indicating a license for each of the plural application programs and information independently set for each of the plural application programs and indicating the one or more APIs which each application program is permitted to call;

a determining unit configured to determine, among the plural APIs, one or more APIs restricted from being called by each of the application programs, based on the information included in the license information corresponding to the application programs and indicating the one or more APIs permitted to each of the application programs; and an operation controlling unit configured to control an operation of the APIs to restrict the one or more APIs determined by the determining unit from being called by the application programs.

2. The information processor according to claim 1, further comprising an information extracting unit configured to extract information indicating at least one API which is not restricted by the given application program from the license information of the given application program, wherein the determining unit determines an API not indicated by the information extracted by the information extracting unit, as the API restricted from being called by the given application program.

3. The information processor according to claim 2, wherein the operation controlling unit permits an operation of the one or more APIs indicated by the information extracted by the information extracting unit.

4. The information processor according to claim 1, further comprising:
　a start-up controlling unit configured to start up the given application program when the license information matches second license information for the given application program stored in a second storage unit included in an image forming apparatus.

5. The information processor according to claim 1, further comprising:
　an application receiving unit configured to receive the given application program via a network; and
　a license information reception unit configured to receive the license information corresponding to the given application program received by the application receiving unit.

6. A method for controlling an information processor capable of executing plural application programs, the information processor including plural application program interfaces (APIs) each configured to provide to a given application program of the plural application programs one of plural control functions provided in the information processor, by being called by the given application program, the method comprising the steps of:
　determining, among the plural APIs, one or more APIs restricted from being called by each application program, based on information included in license information corresponding to each of the application programs and indicating the one or more APIs permitted to each application program, wherein the license information is stored in a license information storing unit, wherein the license information includes information indicating a license for each of the plural application programs and information independently set for each of the plural application programs and indicating the one or more APIs which each application program is permitted to call; and
controlling an operation of the APIs to restrict the one or more determined APIs from being called by the application programs.

7. A recording medium readable by a computer, wherein,
the recording medium stores a program for controlling a computer of an information processor capable of executing plural application programs, the program comprising plural application program interfaces (APIs) each configured to provide to a given application program of the plural application programs one of plural control functions provided in the information processor by being called by the given application program,
the program enables the computer to function as a determining unit for determining, among the plural APIs, one or more APIs restricted from being called by each application program, based on the information included in license information corresponding to each application program and indicating the one or more APIs permitted to each application program, wherein the license information is stored in a license information storing unit, wherein the license information includes information indicating a license for each of the plural application programs and information independently set for each of the plural application programs and indicating the one or more APIs which each application program is permitted to call, and
the program enables the computer to function as an operation controlling unit for controlling an operation of the APIs to restrict the one or more APIs determined by the determining unit from being called by the application programs.

* * * * *